(12) United States Patent
Abbas et al.

(10) Patent No.: US 9,889,993 B2
(45) Date of Patent: Feb. 13, 2018

(54) APPARATUS FOR, AND METHOD OF, CONVEYING FOOD SLICES

(71) Applicant: Frito-Lay Trading Company GmbH, Berne (CH)

(72) Inventors: Bob Abbas, Nottinghamshire (GB); Richard Bailey, Leicestershire (GB); Lindsay Dobson, Oxfordshire (GB); Oliver Herbert, Nottingham (GB); Peter David Herring, Leicestershire (GB); Maria Alejandra Torres, South Croydon (GB)

(73) Assignee: FRITO-LAY TRADING COMPANY GMBH, Berne (CH)

( * ) Notice: Subject to any disclaimer, the term of this patent is extended or adjusted under 35 U.S.C. 154(b) by 0 days.

(21) Appl. No.: 15/030,684

(22) PCT Filed: Oct. 30, 2014

(86) PCT No.: PCT/EP2014/073384
§ 371 (c)(1),
(2) Date: Apr. 20, 2016

(87) PCT Pub. No.: WO2015/063231
PCT Pub. Date: May 7, 2015

(65) Prior Publication Data
US 2016/0244264 A1    Aug. 25, 2016

(30) Foreign Application Priority Data

Oct. 30, 2013 (GB) .................................. 1319186.1

(51) Int. Cl.
*B65G 27/04* (2006.01)
*B65G 11/20* (2006.01)
(Continued)

(52) U.S. Cl.
CPC .............. *B65G 27/04* (2013.01); *A23L 19/18* (2016.08); *B26D 7/32* (2013.01); *B65G 11/203* (2013.01);
(Continued)

(58) Field of Classification Search
CPC ........ B26D 7/32; B65G 27/04; B65G 11/203; B65G 2201/0202; A23L 1/217; A23V 2002/00
See application file for complete search history.

(56) References Cited

U.S. PATENT DOCUMENTS

| | | | | |
|---|---|---|---|---|
| 2001/0026824 | A1* | 10/2001 | Caridis | .................. A23N 12/02 426/506 |
| 2005/0092194 | A1* | 5/2005 | Bajema | ................ B26D 1/0006 99/537 |

(Continued)

FOREIGN PATENT DOCUMENTS

| | | |
|---|---|---|
| CA | 1116192 A1 | 1/1982 |
| CN | 201482737 U | 5/2010 |

(Continued)

OTHER PUBLICATIONS

GB Examination Report from GB Application No. 1319186.1 dated Nov. 29, 2013 (5 pages).

(Continued)

*Primary Examiner* — Mark A Deuble
(74) *Attorney, Agent, or Firm* — Colin P. Cahoon; Shaukat A. Karjeker; Carstens & Cahoon, LLP

(57) ABSTRACT

An apparatus for conveying food slices, the apparatus comprising a conveyor element having an upper conveying surface, the conveying surface being downwardly inclined from an input end thereof towards an output end thereof, a vibratory actuator coupled to the conveyor element and adapted to cause vibratory motion of the conveying surface, (Continued)

the vibratory motion being at least partly in a direction along the conveying surface, and a liquid supply for supplying liquid onto the conveying surface to form a liquid film over at least part of the conveying surface.

49 Claims, 1 Drawing Sheet

(51) Int. Cl.
    *B26D 7/32*     (2006.01)
    *A23L 19/18*     (2016.01)

(52) U.S. Cl.
    CPC .. *A23V 2002/00* (2013.01); *B65G 2201/0202* (2013.01)

(56) References Cited

U.S. PATENT DOCUMENTS

2011/0281005 A1* 11/2011 Desai .................. A23L 5/21
                                                                           426/438
2013/0277284 A1* 10/2013 Jones .................. B07C 5/02
                                                                           209/587
2015/0189903 A1* 7/2015 Spurr .................. A23L 1/217
                                                                           426/242
2017/0190520 A1* 7/2017 Grasselli ............... B65G 59/12

FOREIGN PATENT DOCUMENTS

GB              2481468 A      12/2011
JP              02209317 A      8/1990

OTHER PUBLICATIONS

International Search Report and Written Opinion from PCT/EP20141073384 dated Jun. 19, 2015 (15 pages).

GB Examination Report from GB Application 1319186.1 dated Oct. 27, 2015 (2 pages).

* cited by examiner

APPARATUS FOR, AND METHOD OF, CONVEYING FOOD SLICES

CROSS-REFERENCE TO RELATED APPLICATIONS

This application is a US 371 National Stage Application from International Application PCT/EP2014/073384 filed Oct. 30, 2014, which claims priority to Europe Application 1319186.1 filed Oct. 30, 2013, the contents of which are incorporated herein by reference.

BACKGROUND OF THE INVENTION

Technical Field

This invention relates to an apparatus for and method of conveying food slices. In particular, the invention relates to an apparatus for and method of conveying potato slices in the manufacture of potato chips.

Description of Related Art

In some food manufacturing processes, food slices are prepared which are required to be conveyed from a first apparatus to a second apparatus. A number of different conveying apparatus are well known in the art, such as conveyor belts, flumes, etc. In some apparatus and methods the slices may be conveyed in bulk or in a stacked or overlapped configuration. However, in other apparatus and methods the slices are required to be conveyed individually, or in a "singulated" configuration, with no or minimal overlap between adjacent slices. When the food slices are thin and have a significant degree of flexibility, there is an increased chance of inadvertent slice overlap because the slices are less likely to butt up against each other, which would tend to occur with thicker and more rigid slices. An example of such thin and flexible slices is potato slices which are prepared during the manufacture of potato chips, which have a typical thickness of less than 2.5 mm, such as from 1 to 1.5 mm, and, prior to frying, are highly flexible.

When conveying food slices from a first apparatus to a second apparatus, in some applications the product feed-out rate from the first apparatus is different from the product feed-in rate to the second apparatus. In some particular applications, it may be desired to increase the packing density of products on the conveyor between the first and second apparatus.

When the food products have a tendency to overlap, there may be a problem to achieve product singulation, by avoiding slice overlap, in combination with a high packing density of product on the conveyor, which may be required to achieve efficient production rates.

GB-A-2481272 discloses an apparatus for, and method of, producing potato chips in which potato slices are subjected to lipophilic conditioning of the potato slices, by immersing the potato slices in heated oil, prior to a microwave explosive dehydration step, in which the oil-treated potato slices are conveyed through a microwave apparatus. In the lipophilic conditioning step, the slices are conveyed in batches though an oil bath by a helical conveyor. Then the slices are flowed down a flume and excess oil is removed prior to depositing the slices onto the conveyor which transports the slices through a microwave apparatus. The slices exiting the flume are highly singulated. GB-A-2481468 discloses a specific flume construction for use in that process.

However, there is a problem in taking the input singulated product flow from the flume and converting that into a highly packed product flow through the microwave apparatus which provides a slice distribution on the microwave conveyor with a high packing density and negligible product overlap.

In the manufacturing process disclosed in GB-A-2481272, it is essential to achieve consistent slice singulation in order to avoid arcing during the microwave explosive dehydration step. Arcing would cause consequential degradation in product quality, such as browning, burning, fusing of slices, etc.

The challenge is to achieve such slice singulation, and avoiding slice overlap, in combination with a high packing density of the sliced products on the conveyor, which is essential to achieve efficient production rates.

GB-A-2481471 discloses an apparatus for separating food slices, such as potato slices used in the manufacturing process disclosed in GB-A-2481272, which are carried on a first conveyor and depositing the food slices in a separated configuration onto a second conveyor. That apparatus employs an assembly of a kick roller with air knives to separate the slices. Although the apparatus disclosed in GB-A-2481471 achieves satisfactory slice separation, there is a need for a simpler and more versatile technical solution to the achievement of the combination of slice separation and close packing on a conveyor.

SUMMARY OF THE INVENTION

Accordingly, the present invention provides an apparatus for conveying food slices, the apparatus comprising a conveyor element having an upper conveying surface, the conveying surface being downwardly inclined from an input end thereof towards an output end thereof, a vibratory actuator coupled to the conveyor element and adapted to cause vibratory motion of the conveying surface, the vibratory motion being at least partly in a direction along the conveying surface, and a liquid supply for supplying liquid onto the conveying surface to form a liquid film over at least part of the conveying surface.

The present invention further provides a method of conveying food slices, the method comprising the steps of:

(a) providing a conveyor element having an upper conveying surface, the conveying surface being downwardly inclined from an input end thereof towards an output end thereof;

(b) supplying liquid onto the conveying surface to form a liquid film over at least part of the conveying surface;

(c) feeding food slices onto the input end of the conveying surface;

(d) vibrating the conveyor element to cause vibratory motion of the conveying surface, a component of the vibratory motion being at least partly in a direction substantially along the conveying surface, the vibratory motion causing food slices on the liquid film to be slid downwardly towards the output end; and (e) outputting the food slices at the output end.

Preferred features are defined in the respective dependent claims.

The present invention solves the problem of achieving the combination of product singulation and increased packing density by employing a vibratory conveyor which is provided with a supply of a lubricating liquid, such as edible oil or water. The vibratory conveyor receives singulated products, such as food slices, from an upstream product conveyor, such as a belt conveyor, and vibrates, in particular "shakes" or "jiggles", the slices after they have landed on the surface of the vibratory conveyor. Such shaking, combined with gravity, causes the slices to be conveyed, as a result of a sliding action over the surface of the vibratory conveyor, to a downstream apparatus, such as a treatment apparatus or a downstream conveyor. The conveyor surface does not move translationally between input and output ends of the conveyor, but rather vibrates locally, and the slices slide over the conveyor surface rather than having the conveyor surface move together with the slices between the input and output ends.

The liquid forms a coherent film on the upper surface of the vibratory conveyor. The combination of (i) the vibratory motion substantially in the plane of the conveyor surface, (ii) the liquid film between the slices and the upper surface of the vibratory conveyor, and (iii) a forward and downward incline of the conveyor surface conveys the slices forwardly along the conveyor in a downstream direction and progressively increases the slice packing density without causing slice overlap.

It has been found that this lubricated vibratory conveyor causes the products to be pushed together to increase the packing density but without causing inadvertent product overlap.

In another aspect, the present invention provides a flume for separating food slices in a flow of liquid, the flume comprising a tank having an input end of the tank upstream, with respect to flow of the liquid through the flume, of an output end of the tank, a sump portion at an upstream part of the tank, wherein a bottom wall of the tank has an upstream portion in the sump portion and a downstream portion downstream of the sump portion, wherein the upstream portion is upwardly oriented, in a downstream direction, a feed pipe suitable for flowing a supply of food slices in a flow of liquid into the sump portion, and, downstream of the sump portion, two opposed side walls of the tank forming an outwardly flaring configuration extending towards the output end.

The present invention further provides a method of separating food slices in a flow of liquid, the method comprising the steps of:

(a) feeding a supply of food slices in a supply of liquid into an upstream sump portion of a tank of a flume;

(b) causing the food slices and liquid exiting the sump portion to mount an upwardly inclined ramp formed by an upstream portion of a bottom wall of the tank; and (c) downstream of the sump portion, flowing the food slices and liquid along a downstream portion of the bottom wall of the tank and between two opposed side walls of the tank which form an outwardly flaring configuration.

BRIEF DESCRIPTION OF THE DRAWINGS

Preferred features are defined in the respective dependent claims.

An embodiment of the present invention will now be described, by way of example only, with reference to the accompanying drawings in which.

Figures 1, 2:
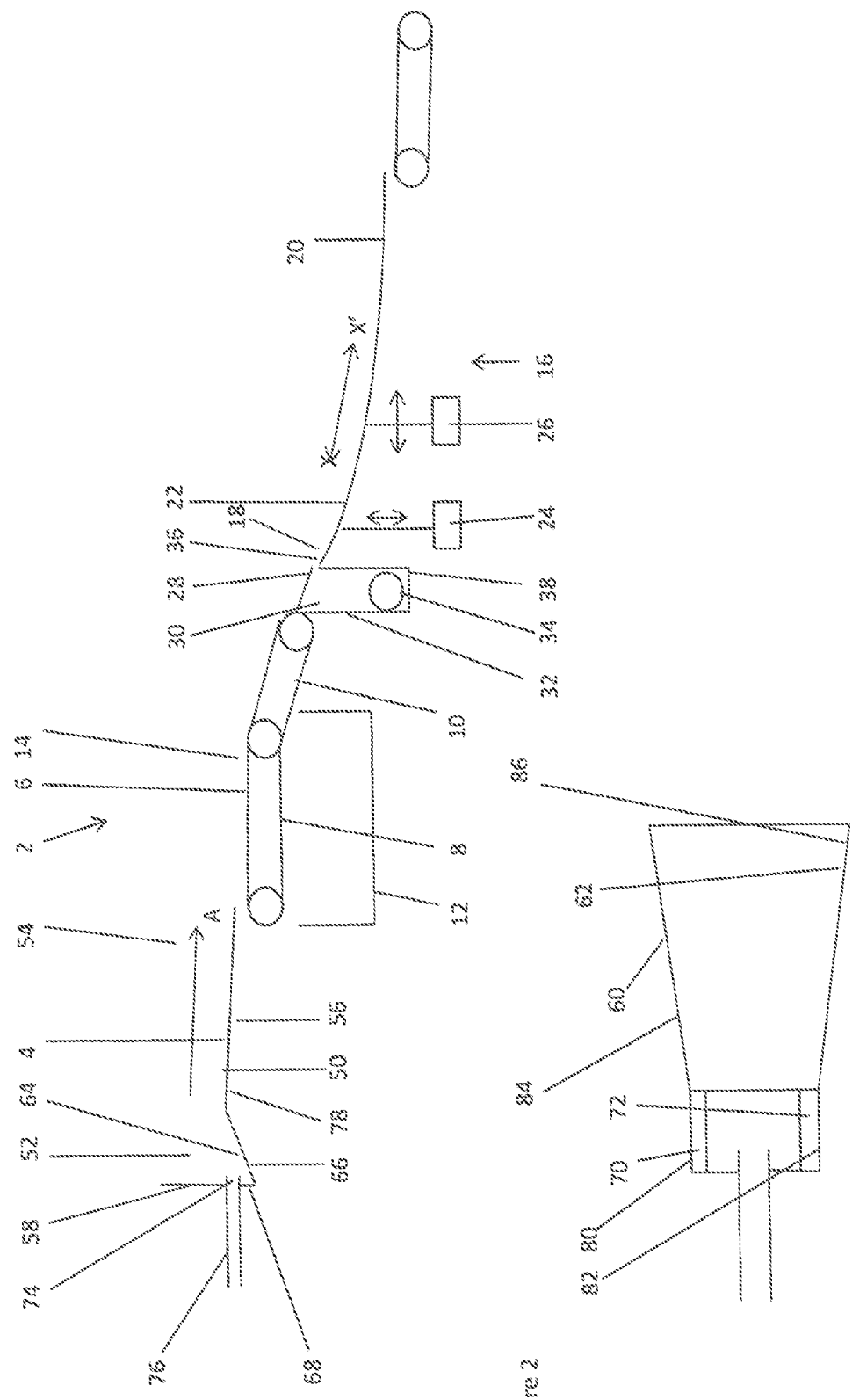
FIG. 1 is a schematic side view of an apparatus for conveying potato slices, prior to microwave cooking, according to an embodiment of the present invention.
FIG. 2 is a plan view of the oil flume in the apparatus of FIG. 1.

An embodiment of an apparatus for conveying potato slices, prior to microwave cooking of the potato slices to form potato chips, according to one aspect of the present invention is illustrated in FIGS. 1 and 2.

DETAILED DESCRIPTION OF THE INVENTION

Referring to FIGS. 1 and 2, a conveying apparatus 2 includes an oil flume 4 which is part of a lipophilic preconditioning unit for potato slices. The potato slices in a flow of heated edible oil are slid along the flume 4 (indicated by arrow A) toward an endless belt conveyor assembly 6. The conveyor assembly 6 includes a first endless belt conveyor 8 having a substantially horizontal orientation which is coupled to a second endless belt conveyor 10 having a downwardly inclined orientation. An inlet end of the conveyor assembly 6 communicates with the exit end of the oil flume 4. The conveyor assembly 6 carries a succession of the potato slices on its upper surface 14.

The oil flume 4 comprises a tank 50 with an input end 52 upstream of an output end 54. The tank 50 has a bottom wall 56, an upstream end wall 58 and two opposed side walls 60, 62. An upstream part of the tank 50 comprises a sump portion 64. The sump portion 64 is defined by an upstream part 66 of the bottom wall 56, a lower part 68 of the upstream end wall 58 and respective downwardly and inwardly flaring lower parts 70, 72 of the side walls 60, 62. Above the lower parts 70, 72, the respective portions 80, 82 of the side walls 60, 62 are parallel and aligned along a longitudinal direction of the oil flume extending between the input end 52 and the output end 54. Downstream of the respective portions 80, 82, the downstream portions 84, 86 of the side walls 60, 62 flare outwardly and are inclined to the longitudinal direction of the oil flume extending between the input end 52 and the output end 54. This forms an outwardly flaring "fishtail" configuration of the flume 4 towards the output end 54.

A substantially horizontally oriented end part 74 of a feed pipe 76 extends through the lower part 68 into the sump portion 64. In use, the feed pipe 76 feeds a supply of food slices, in particular potato slices, in a supply of edible oil into the sump portion 64. The upstream part 66 is upwardly oriented, in a downstream direction, at an angle of from 18 to 26 degrees to the horizontal, preferably from 20 to 24 degrees to the horizontal, most preferably about 22 degrees to the horizontal.

In an alternative embodiment, a vertical feed pipe has an outlet above the sump portion.

A downstream part 78 of the bottom wall 56, in the "fishtail" region, is either substantially horizontal or downwardly oriented at a shallow angle, for example from 2 to 6 degrees to the horizontal, optionally about 4 degrees to the horizontal.

Therefore the food slices are fed horizontally into the sump portion 64, and then are required to mount an inclined ramp formed by the upwardly oriented upstream part 66 forming the bottom wall of the sump portion 64.

It has been found surprisingly that providing the combination of a substantially horizontal infeed of the slices into the sump portion together with an inclined ramp at the angle discussed above causes enhanced mutual separation, i.e. singulation, of the food slices as the food slices flow along the flume.

As the slices enter the "fishtail" portion of the flume, the slices spread transversely across the increasing flared width of the flume. This provides increased slice throughput yet achieves a high proportion of non-overlapping slices, i.e. singulation. The bottom wall of the "fishtail" portion of the flume may be horizontal, for example if the oil flow rate is relatively high and/or the length of the "fishtail" portion is relatively short. Alternatively, the bottom wall of the "fishtail" portion of the flume may be horizontal. The oil flow rate and slice flow rate can readily be tested by routine experimentation by the person skilled in the art to determine acceptable geometries for the fishtail portion for any given product/oil flow rate.

For some food slice products, water may be employed in the flume rather than an edible oil.

The first endless belt conveyor 8 is permeable to the oil and typically comprises an open mesh structure, for example comprised of a stainless steel balanced spiral wire mesh belt. The excess oil flows downwardly through the first endless belt conveyor 8 and is captured by an oil capture device 12, in the form of a tank, located thereunder.

The potato slices are typically randomly delivered onto the conveyor assembly 6. The potato slices are delivered onto the conveyor assembly 6 in a slice distribution so as to have at least about 50%, typically at least 75%, more typically greater than 90%, of the slices being single slices, i.e. not overlapping with an adjacent slice. In addition, at least 50% of the overlaps are no more than 50% of the area of each of the respective overlapping slices. Also, for each overlap no more than two slices are stacked one upon the other on the conveyor assembly 6. This substantially provides a monolayer of singulated potato slices across the width of the conveyor assembly 6.

The potato slices typically have a thickness of 1 to 2.5 mm, more typically from 1 to 1.5 mm, yet more typically about 1.3 mm (51 thousandths of an inch).

In a preferred embodiment, the potato slices have been pre-treated in oil in a lipophilic conditioning process. The oil typically comprises an edible oil, typically a vegetable oil such as sunflower oil, conventionally used for manufacturing potato chips. The oil is employed in the lipophilic conditioning to provide the required organoleptic properties to the resultant potato chip, which has been cooked by the combination of the preliminary oil treating step and the subsequent microwave cooking step, and has not been fried, as for a conventional potato chip.

Downstream of the conveyor assembly 6 is located a vibratory conveyor element 16 having an upper conveying surface 22. The conveying surface 22 is downwardly inclined from an input end 18 towards an output end 20 of the conveying surface 22. The vibratory conveyor element 16 comprises a rigid elongate plate, which is preferably downwardly curved. The conveying surface 22 is substantially concave, and may optionally have a surface texture to reduce the contact area between the lower surface of the slice and the conveying surface 22. The conveying surface 22 may be substantially parabolic or alternatively may have a substantially constant radius of curvature. The radius of curvature in either case is typically from 0.75 to 1.5 metres, optionally about 1 metre. Typically, the input end 18 of the conveying surface is inclined at an angle of from 10 to 15 degrees to the horizontal above the output end 20. The conveying surface 22 preferably has a substantially constant profile extending across a transverse width of the conveying surface 22.

The conveying apparatus 2 may further comprise an adjustment mechanism 24 for adjusting the inclination of the conveying surface 22. A higher angle of inclination to the horizontal increases the conveying speed of products along the conveying surface 22. The angle has been found to have a substantially linear relationship with slice speed along the conveyor element 16, thereby providing a speed control by varying the downward inclination of the vibratory conveyor element 16.

A vibratory actuator 26 is coupled to the vibratory conveyor element 16. The vibratory actuator 26 is adapted to cause vibratory motion of the conveying surface 22. A component of the vibratory motion is at least partly in a direction along the conveying surface 22, indicated by arrows X-X'. The vibratory actuator 26 is adapted to cause a component of vibratory motion of the conveying surface 22 in a direction extending between the input end 18 and the output end 20, typically oscillatory vibratory motion of the conveying surface 22 solely in a direction generally along the conveying surface 22, and preferably tangential to at least one part of the conveying surface 22. However, the vibration may alternatively or additionally be in a transverse or lateral direction with respect to the conveying direction extending between the input and output ends 18, 20, namely at an angle, optionally substantially a right angle, to the direction X-X'.

In a preferred embodiment, the vibratory actuator 26 is adapted to cause the vibratory motion of the conveying surface 22 to have an amplitude of from 0.5 to 5 mm, optionally from 1 to 3 mm, further optionally about 2 mm. In the preferred embodiment, the vibratory actuator 26 is adapted to cause the vibratory motion of the conveying surface 22 to have a frequency of from 5 to 100 Hz, optionally from 10 to 50 Hz, further optionally from 25 to 40 Hz, still further optionally about 33 Hz.

The conveying apparatus 2 further includes a liquid supply for supplying liquid (indicated by arrow B) onto the conveying surface 22 to form a liquid film over at least part of the conveying surface 22. The liquid supply includes a nozzle 28 located at the input end 18 of the conveying surface 22 and extending transversely across the conveying surface 22 to provide a liquid flow (indicated by arrow C) across a majority, or all, of a transverse width of the conveying surface 22.

The nozzle 28 is located at an upper end 30 of a manifold chamber 32 which is located beneath the input end 18 of the conveying surface 22. An oil supply pipe 34 located in the manifold chamber 32. An opening 36 of the nozzle 28 has a width of from 1 to 3 mm, optionally about 2 mm, and extends transversely across the input end 18 of the conveying surface 22. Typically, the conveying surface 22 is formed from sheet metal and the manifold chamber 32 is formed within a folded portion 38 of the sheet metal which is integral with the sheet metal of the conveying surface 22.

The liquid comprises an edible oil or water which forms a coherent liquid film over the conveying surface 22 and acts as a lubricating liquid between the conveying surface 22 and the food slices to assist relative motion therebetween. Most preferably, the liquid is the same edible oil as used for the flume, most typically sunflower oil when the slices are potato slices. The downward sliding motion of the food slices occurs as a result of the combination of the downward inclination of the conveying surface 22, causing the food slices to move under the action of gravity, and the intermittent vibratory motion of the conveying surface 22, causing intermittent lateral sliding forces to be applied to the food slices to enhance the progressive motion of the food slices from the input end to the output end 20.

In the method of conveying food slices using the apparatus of FIGS. 1 and 2, oil and food slices are flowed down the flume 4 onto the first endless belt conveyor 8. The first endless belt conveyor 8 has a forward surface velocity which is not less than the oil velocity on the flume 4. This ensures that slices landing on the upstream end of the first endless belt conveyor 8 from the downstream end of the flume 4 do not inadvertently stack or overlap. Then the slices are fed onto the second endless belt conveyor 10, and from that onto the input end 18 of the conveying surface 22 of the conveyor element 16.

The liquid is supplied from the nozzle 28 onto the conveying surface 22 to form a liquid film over at least part of the conveying surface and food slices, typically potato slices, are fed onto the input end 18 of the conveying surface 22. The liquid may comprise an edible oil or water. Preferably, the liquid flow is provided across a majority of a transverse width of the conveying surface 22. The conveyor element 16 is vibrated to cause vibratory motion of the conveying surface 22, as discussed above, causing food slices on the liquid film to be slid downwardly towards the output end 20. The food slices are outputted at the output end 20 for subsequent processing, such as microwave cooking.

Most typically, the vibratory motion is oscillatory and may have a component in any direction substantially along the conveying surface 22, for example in the longitudinal conveying direction and/or the transverse directions thereto.

The upper conveying surface 22 of the conveyor element 16 may be substantially concave, and optionally may be provided with a surface texture, as discussed above, which may enhance slice motion across the conveying surface 22 and increase the achievement of increased packing density.

Typically, the food slices are flexible and have a thickness of from 0.5 to 2.5 mm, for example from 1 to 1.5 mm, such as about 1.3 mm, for potato slices. Typically, prior to being fed onto the conveying surface 22 the food slices are coated in oil.

Preferably, the food slices are fed onto the conveying surface 22 in a substantially non-overlapping configuration, and the food slices are outputted at the output end 20 in a substantially non-overlapping configuration. The vibrating step preferably causes an increase of the packing density of the food slices on the conveying surface 22 as the food slices are conveyed from the input end 18 to the output end 20.

The input singulation is substantially maintained between the input and output ends 18, 20 of the vibratory conveyor while increasing the packing density. The slice velocity of slices being deposited onto the vibratory conveyor is significantly higher than the output slice velocity, for example at least 5 times higher, which correspondingly increases the packing density while substantially retaining the same width of product flow down the vibratory conveyor. The vibratory conveyor acts to decelerate the incoming product flow, thereby increasing packing density yet without substantially causing slice overlay, and so maintaining slice singulation at the output end.

The liquid film thickness is controlled to avoid slice stacking or overlap resulting from excessive liquid. The initial film thickness corresponds to the nozzle opening width, for example from 1 to 3 mm, typically about 2 mm.

In comparative testing, the combination of (a) lubricating liquid such as oil on the vibratory conveyor and (b) vibratory motion was found to cause slice packing without overlap. In contrast, when (a) lubricating liquid such as oil on the vibratory conveyor and (b) vibratory motion were used independently, slice overlap occurred. This shows that the combination of (a) and (b) provides a synergistic technical effect of avoiding slice overlap which neither (a) nor (b) can provide independently.

Although the vibratory conveyor and the associated method have particular application in the manufacture of potato chips as discussed above for the illustrated embodiment, the apparatus is independent of the slice selection and liquid selection, and the apparatus and method may have utility in other technical areas where it is desired to increase the packing density of products, particularly food slices, on a conveyor without causing slice overlap. In the illustrated embodiment, avoiding slice overlap is important for avoiding arcing problems during subsequent microwave explosive dehydration, whereas in other processes process avoiding slice overlap may be important for avoiding other problems in alternative downstream processes, such as baking or packing.

Various modifications to the apparatus and method of the invention as exemplified by the illustrated embodiment will be apparent to the person skilled in the art.

The invention claimed is:

1. An apparatus for conveying food slices, the apparatus comprising:
   a tank having an upstream end for receiving food slices, and a downstream end from which the food slices exit, the downstream and having a fishtail flume causing food slices to spread transversely across a bottom thereof,
   a receiving conveyor located to receive food slices falling from the fishtail flume,
   a conveyor element located to receive food slices from an exit end of the receiving conveyor, the conveyor element having an upper conveying surface, the conveying surface being downwardly inclined from an input end thereof towards an output end thereof,
   a vibratory actuator coupled to the conveyor element and causing vibratory motion of the conveying surface, the vibratory motion being at least partly in a direction along the conveying surface, and
   a liquid supply for supplying liquid onto the conveying surface to form a liquid film over at least part of the conveying surface.

2. The apparatus according to claim 1, wherein the conveyor element comprises a rigid plate.

3. The apparatus according to claim 1, wherein an upper surface of the conveyor element is downwardly curved, optionally having a radius of curvature of from 0.75 to 1.5 meters.

4. The apparatus according to claim 1, wherein the conveying surface is substantially concave.

5. The apparatus according to claim 3, wherein the conveying surface is substantially parabolic.

6. The apparatus according to claim 1, wherein the input end is inclined at an angle of from 10 to 15 degrees to the horizontal above the output end.

7. The apparatus according to claim 1, wherein the conveying surface has a substantially constant profile extending across a transverse width of the conveying surface.

8. The apparatus according to claim 1, wherein the vibratory actuator is adapted to cause a component of vibratory motion of the conveying surface in a direction extending between the input end and the output end.

9. The apparatus according to claim 1, wherein the vibratory actuator is adapted to cause oscillatory vibratory motion of the conveying surface.

10. The apparatus according to claim 1, wherein the vibratory actuator is adapted to cause a component of vibratory motion of the conveying surface at least partly in a direction generally along the conveying surface.

11. The apparatus according to claim 1, wherein the vibratory actuator is adapted to cause a component of oscillatory vibratory motion of the conveying surface tangential to at least one part of the conveying surface.

12. The apparatus according to claim 1, wherein the vibratory actuator is adapted to cause the vibratory motion of the conveying surface to have an amplitude of from 0.5 to 5 mm, optionally from 1 to 3 mm, further optionally about 2 mm.

13. The apparatus according to claim 1, wherein the vibratory actuator is adapted to cause the vibratory motion of the conveying surface to have a frequency of from 5 to 100 Hz, optionally from 10 to 50 Hz, further optionally from 25 to 40 Hz, still further optionally about 33 Hz.

14. The apparatus according to claim 1, wherein the a liquid supply include a nozzle located at the input end of the conveying surface and extending transversely across the conveying surface to provide a liquid flow across a majority of a transverse width of the conveying surface.

15. The apparatus according to claim 14 wherein the nozzle is located at an upper end of a manifold chamber which is located beneath the input end of the conveying surface, and the apparatus further comprises a supply pipe located in the manifold chamber.

16. The apparatus according to claim 15 wherein an opening of the nozzle has a width of from 1 to 3 mm, optionally about 2 mm and extends transversely across the input end of the conveying surface.

17. The apparatus according to claim 14 wherein the conveying surface is formed from sheet metal and the manifold chamber is formed within a folded portion of the sheet metal which is integral with the sheet metal of the conveying surface.

18. A method of conveying food slices, the method comprising the steps of:
(a) spreading out the food slices across a fishtail exit of a tank;
(b) delivering food slices from the fishtail end onto a conveyor;
(c) transporting the food slices onto a conveyor element having an upper conveying surface, the conveying surface being downwardly inclined from an input end thereof towards an output end thereof;
(d) supplying liquid onto the conveying surface to form a liquid film over at least part of the conveying surface;
(e) feeding food slices onto the input end of the conveying surface;
(f) vibrating the conveyor element to cause vibratory motion of the conveying surface, a component of the vibratory motion being at least partly in a direction substantially along the conveying surface, the vibratory motion causing food slices on the liquid film to be slid downwardly towards the output end; and
(g) outputting the food slices at the output end.

19. The method according to claim 18, wherein the food slices comprise potato slices.

20. The method according to claim 18, wherein the food slices are flexible and have a thickness of from 0.5 to 2.5 mm.

21. The method according to claim 18, wherein the food slices are coated in an edible oil.

22. The method according to claim 18, wherein the liquid comprises an edible oil or water.

23. The method according to claim 18, wherein the vibratory motion is caused by a vibratory actuator coupled to the conveyor element.

24. The method according to claim 18, wherein the conveyor element comprises a rigid plate.

25. The method according to claim 18, wherein an upper surface of the conveyor element is downwardly curved, optionally having a radius of curvature of from 0.75 to 1.5 meters.

26. The method according to claim 18 wherein the conveying surface is substantially concave.

27. The method according to claim 18, wherein the conveying surface is substantially parabolic.

28. The method according to claim 18, wherein the input end is inclined at an angle of from 10 to 15 degrees to the horizontal above the output end.

29. The method according to claim 18, wherein the conveying surface has a substantially constant profile extending across a transverse width of the conveying surface.

30. The method according to claim 18, wherein a component of the vibratory motion of the conveying surface is in a direction extending between the input end and the output end.

31. The method according to claim 18, wherein the vibratory motion of the conveying surface is oscillatory.

32. The method according to claim 18, wherein a component of the vibratory motion of the conveying surface is at least partly in a direction generally along the conveying surface.

33. The method according to claim 18, wherein the component of the vibratory motion of the conveying surface is oscillatory and tangential to at least one part of the conveying surface.

34. The method according to claim 18, wherein the vibratory motion of the conveying surface has an amplitude of from 0.5 to 5 mm, optionally from 1 to 3 mm, further optionally about 2 mm.

35. The method according to claim 18, wherein the vibratory motion of the conveying surface has a frequency of from 5 to 100 Hz, optionally from 10 to 50 Hz, further optionally from 25 to 40 Hz, still further optionally about 33 Hz.

36. The method according to claim 18, wherein the liquid flow is provided across a majority of a transverse width of the conveying surface.

37. The method according to claim 18, wherein in step (c) the food slices are fed onto the conveying surface in a substantially non-overlapping configuration, and in step (g) the food slices are outputted at the output end in a substantially non-overlapping configuration.

38. The method according to claim 18, wherein the vibrating step (d) causes an increase of the packing density of the food slices on the conveying surface as the food slices are conveyed from the input end to the output end.

39. The method according to claim 18, wherein the velocity of the food slices output at the output end of the conveying surface is lower than the velocity of the food slices fed onto the input end of the conveying surface.

40. The method according to claim 18, wherein the liquid flow is provided from a nozzle which is located at an upper end of a manifold chamber which is located beneath the input end of the conveying surface, and the apparatus further comprises a supply pipe located in the manifold chamber for supplying the liquid to the manifold chamber.

41. The method according to claim 40 wherein an opening of the nozzle has a width of from 1 to 3 mm, optionally about 2 mm, and extends transversely across the input end of the conveying surface.

42. The method according to claim 40 wherein the conveying surface is formed from sheet metal and the manifold chamber is formed within a folded portion of the sheet metal which is integral with the sheet metal of the conveying surface.

43. A method of separating food slices in a flow of liquid, the method comprising the steps of:
(a) feeding a supply of food slices in a supply of liquid into an upstream sump portion of a tank;

(b) causing the food slices and liquid exiting the sump portion to mount an upwardly inclined ramp formed by an upstream portion of a bottom wall of the tank; and
(c) downstream of the sump portion, flowing the food slices and liquid along a downstream portion of the bottom wall of the tank configured as a fishtail flume to spread out the food slices transverse to a direction of travel of the food slices;
(d) pouring the food slices onto a conveyor belt;
(e) transporting the food slices onto a conveyor belt to fall onto a conveyor element having an upper conveying surface, the conveying surface being downwardly inclined from an input end thereof towards an output end thereof;
(f) supplying liquid onto the conveying surface to form a liquid film over at least part of the conveying surface;
(g) feeding food slices onto the input end of the conveying surface;
(h) vibrating the conveyor element to cause vibratory motion of the conveying surface, a component of the vibratory motion being at least partly in a direction substantially along the conveying surface, the vibratory motion causing food slices on the liquid film to be slid downwardly towards the output end; and
(i) outputting the food slices at the output end.

44. The method according to claim 43 wherein the upstream portion of the bottom wall in the sump portion is upwardly oriented, in a downstream direction, at an angle of from 18 to 26 degrees to the horizontal, preferably from 20 to 24 degrees to the horizontal, most preferably about 22 degrees to the horizontal.

45. The method according to claim 43 wherein the downstream portion is substantially horizontal.

46. The method according to claim 43 wherein the downstream portion is downwardly oriented at an angle of from 2 to 6 degrees to the horizontal, optionally about 4 degrees to the horizontal.

47. The method according to claim 43 wherein the supply is fed as a substantially horizontal flow into the sump portion.

48. The method according to claim 43 wherein the supply of food slices in the supply of liquid is fed through a feed pipe which extends through a lower part of an upstream end wall of the tank into the sump portion.

49. The method according to claim 43 wherein, downstream of the sump portion, downstream portions of the side walls are inclined to a longitudinal direction of the tank extending between an input end of the tank and an output end of the tank to form the outwardly flaring configuration.

\* \* \* \* \*